July 19, 1955
A. BORZYM
2,713,235
HONING METHOD AND APPARATUS
Filed May 28, 1953
4 Sheets-Sheet 1
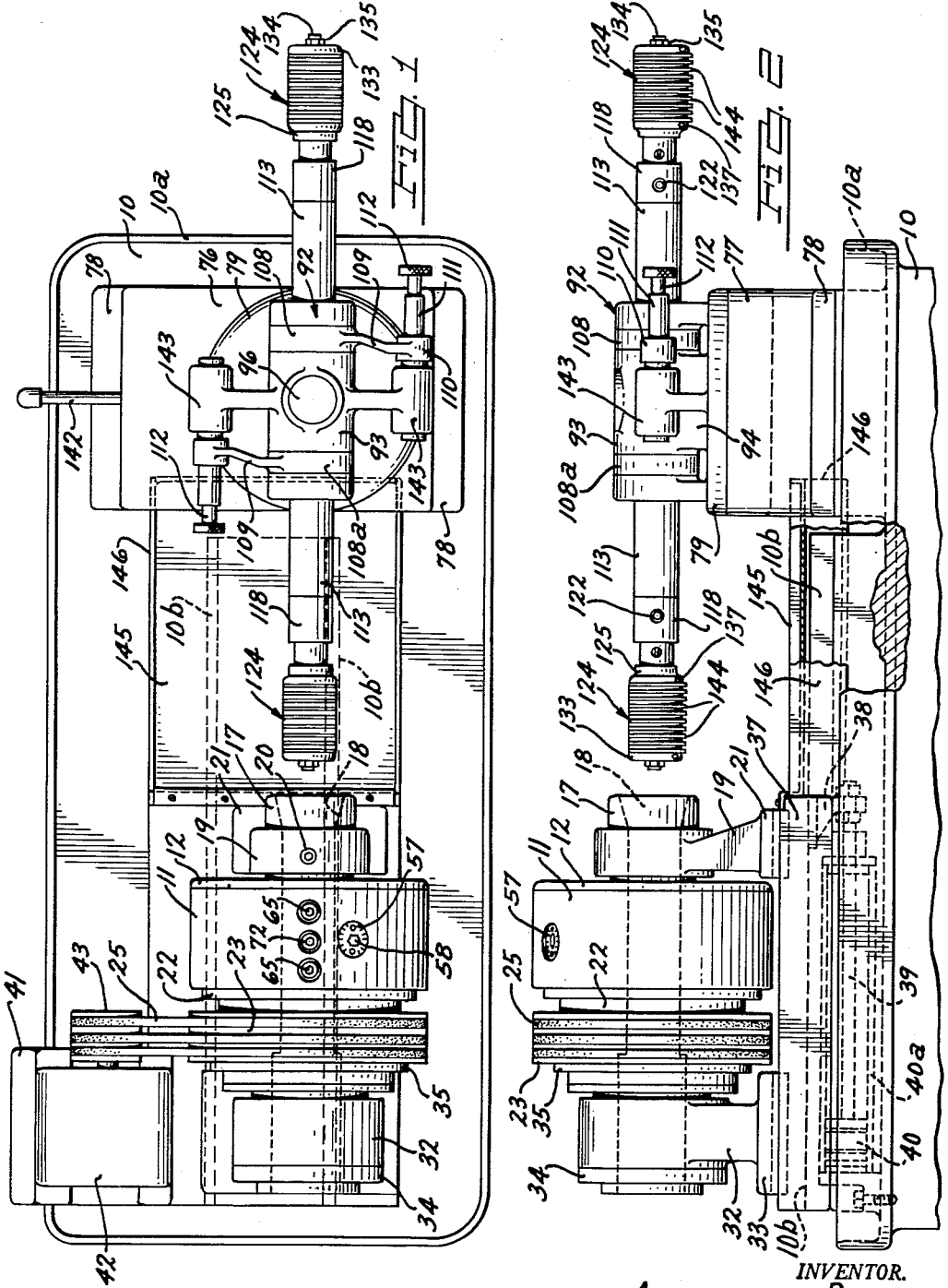
INVENTOR.
ALEXANDER BORZYM
BY
Louis Chayka
ATTORNEY

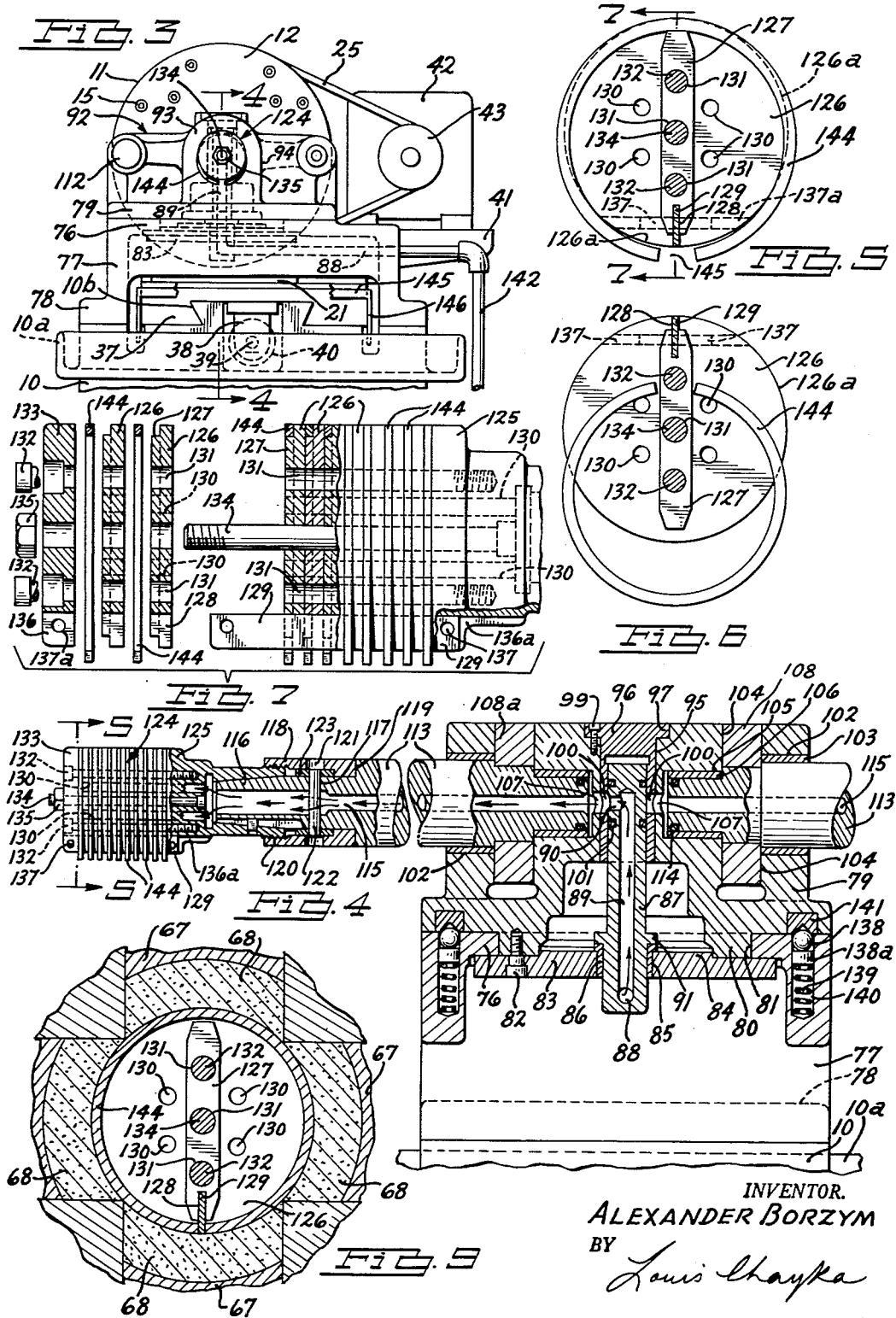

July 19, 1955  A. BORZYM  2,713,235
HONING METHOD AND APPARATUS
Filed May 28, 1953  4 Sheets-Sheet 4

INVENTOR.
ALEXANDER BORZYM
BY Louis Chayka
ATTORNEY

United States Patent Office 2,713,235
Patented July 19, 1955

2,713,235

HONING METHOD AND APPARATUS

Alexander Borzym, Dearborn, Mich.

Application May 28, 1953, Serial No. 358,080

14 Claims. (Cl. 51—73)

The invention pertains to a method of, and an apparatus for honing the outer peripheral or bearing surface of annular objects of a split expansible type. More specifically both the method and the apparatus are directed to honing piston rings generally employed in the cylinders of the internal combustion engines.

The object of my invention is to perform the honing operation on piston rings while the latter are free to expand radially to the extent duplicated during the actual operative use of the piston rings in the cylinders of an internal combustion engine.

Up to now to accomplish the above object at least to some degree, it was necessary to clamp the piston rings from the sides to impart to them a rotary movement but obviously, individual rings clamped from both sides to assure their rotary movement were also held firmly enough to prevent their free radial expansion. It was in order to assure such a radial expansion of the rings without the need of clamping them from the sides that I have devised my apparatus described herein.

Another object of my invention is to secure a continuous operation of my apparatus by providing means for loading a plurality of piston rings to be honed upon one part of said apparatus while another batch of rings is being honed within another part thereof.

A further object of my invention is to provide means for a quick replacement, within the apparatus, of the rings already honed, with a load of rings to be honed. Another object of my invention is to provide means whereby a batch of rings upon having been honed, may be released all at once from the respective part of the apparatus, by gravity, on a 180 degree reversal in a vertical plane of a member carrying said rings.

These and other inventive features to be described herein pertain to the manipulation of the piston rings preliminary to, during and after the honing operation. In addition thereto, I have devised novel and useful means pertaining to the arrangement of the honing stones forming a part of my apparatus. As said stones are disposed in a circular arrangement for operative action upon the peripheral surfaces of the respective rings, one of my objects is to provide means whereby all the stones may be adjusted to any desired radius within the limits of movement of the individual stones, by a rotary movement of one member controlling the position of all said stones.

Figure 8:
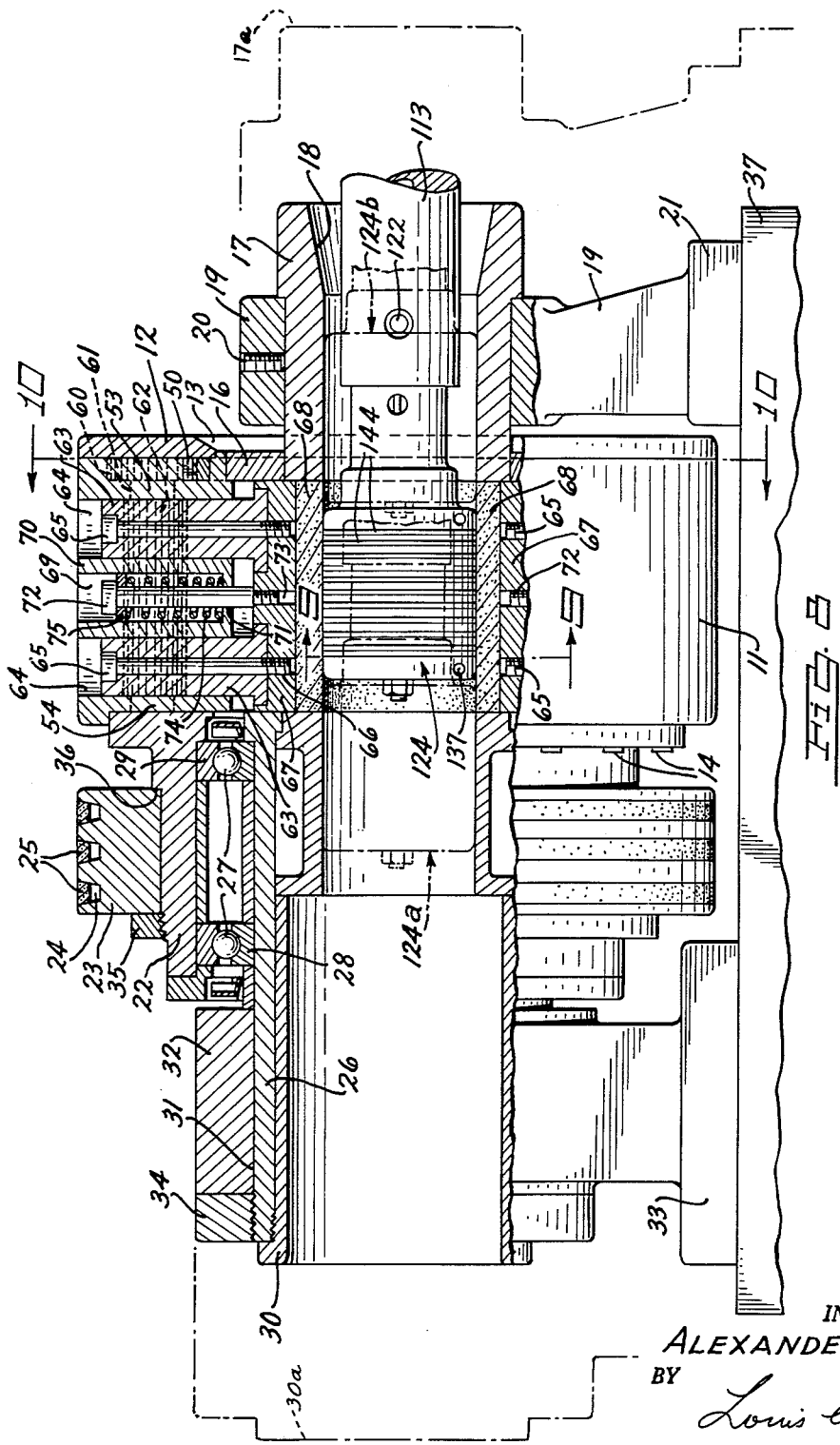
Figure 10:
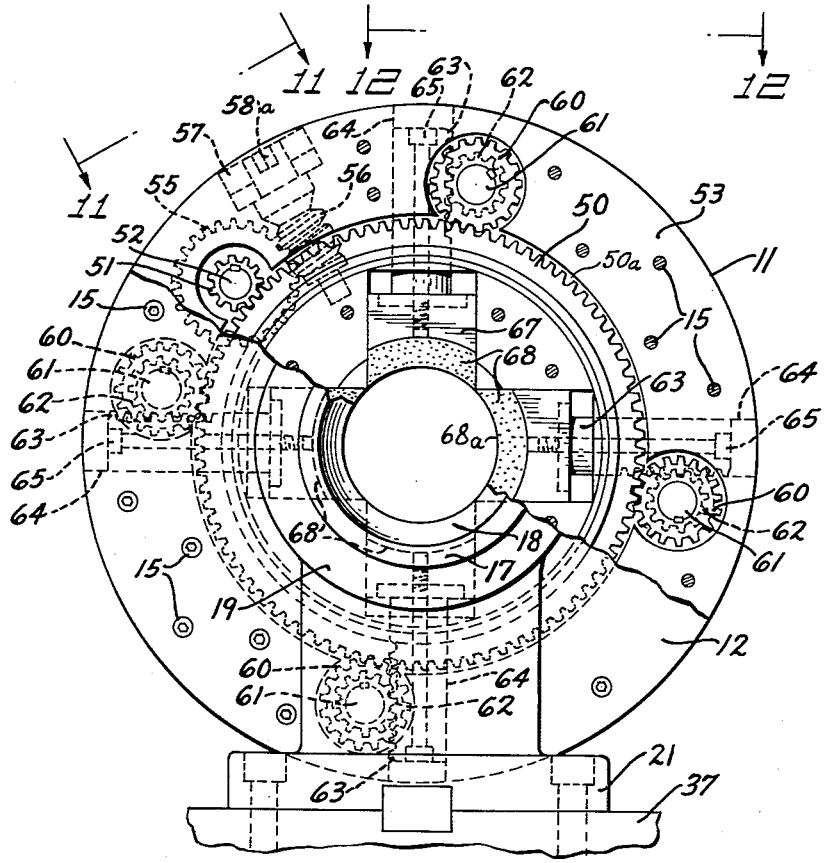
Figure 11:
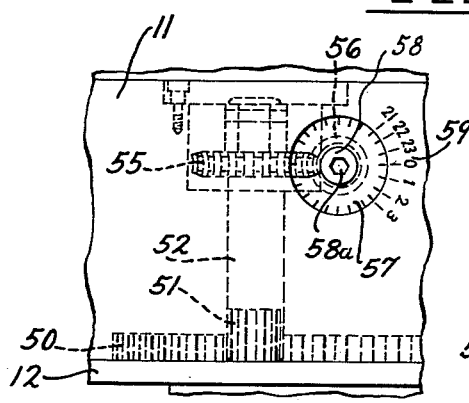
Figure 12:
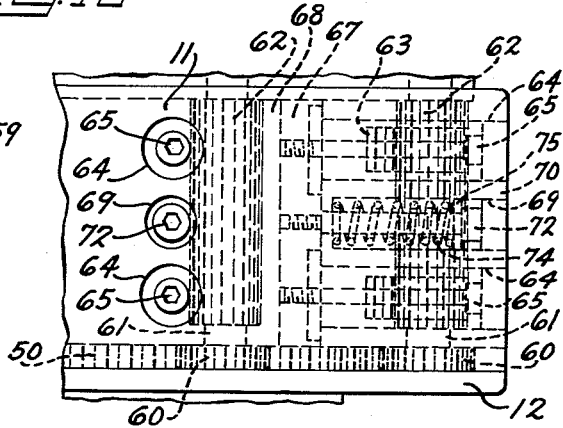

I shall now describe my invention with reference to the accompanying drawings in which Fig. 1 is a top elevational view of my apparatus;
Fig. 2 is a side elevational view thereof;
Fig. 3 is an end view of said apparatus;
Fig. 4 is a sectional view on line 4—4 of Fig. 3;
Fig. 5 is a sectional view on line 5—5 of Fig. 4 the view including a side view of a piston ring mounted upon a member forming a part of the apparatus;
Fig. 6 shows the same sectional view as disclosed in Fig. 5 with the above said member in a diametrically reversed position, the view including a piston ring in a position partly disengaged from said member;
Fig. 7 is an exploded view with parts in section on line 7—7 of Fig. 5 of a piston supporting assembly which form a part of my apparatus;
Fig. 8 is a side elevational view, partly in section of a part of the apparatus including a housing containing honing stones, the view disclosing also a side elevational view of a plurality of piston rings mounted upon a supporting member and disposed within the housing in a frictional contact with the stones;
Fig. 9 is a sectional view on line 9—9 of Fig. 8;
Fig. 10 is a sectional view on line 10—10 of Fig. 8;
Fig. 11 is a fragmentary view of a detail of construction as taken on line 11—11 of Fig. 10;
Fig. 12 is a view of details of construction as seen from line 12—12 of Fig. 10;

Similar numerals refer to similar parts throughout the several views.

The apparatus described herein, comprises two principal assemblies mounted upon a common base 10 for a co-working combination. The first of said assemblies includes a plurality of abrading elements, the second embraces means for support of the piston rings to be honed by said abrading elements.

The assembly containing the abrading elements includes a thick walled drum 11 which at one end, to be referred herein as the front end, is closed by a circular plate 12 provided with an axial circular opening 13 and secured to the wall of the drum by bolts 15. Fitted at one end into the front portion of the drum by means of an annular member 16m is a cylinder 17, terminating at its opposite end with an outwardly flaring mouth 18. It is through this mouth that piston rings supported by a carrying member may pass into the interior of the drum.

For support at its front portion, the cylinder is mounted within a circular aperture in the upper end of the standard 19 rising from an integrally formed base 21 and is secured against displacement by a set screw 20. At its rear end, the drum is joined by means of bolts 14 to a cylindrical shell 22 which supports a wheel 23, the outer surface of which contains a plurality of grooves 24 for reception of individual pulley belts 25. The wheel is suitably keyed to said shell for rotation therewith about an oblong sleeve 26. Numeral 27 indicates conventional ball bearings interposed between the shell 22 and the sleeve 26, the ball bearings being disposed between races 28 and 29 respectively. Fitted into the outer end of the sleeve is a liner 30, the sleeve itself being held at its outer end within a circular aperture 31 in the upper portion of a standard 32. The base of the standard integrally formed therewith, is marked 33. A retaining ring 34 is threaded upon the outer end of said sleeve 26 while another retaining ring 35 is threaded upon the above named shell 22, locking the wheel 23 against a shoulder 36.

Both standards 19 and 32 are mounted on a carriage 37 which rests on a dove slide 10b rising from base 10 the slide being shown in Figs. 2 and 3. A tongue 38 extending downwardly from carriage 37 is connected to a rod 39 terminating at one end with a piston 40. The latter is disposed in a cylinder 40a to which liquid under pressure is admitted from outside source to cause a reciprocal movement of the piston and the carriage connected thereto. As the mechanism is well known a more detailed description thereof is omitted.

Mounted upon a shelf 41 which extends sideways from the carriage but is affixed thereto, is a motor 42, preferably an electric one. The motor includes a pulley 43 which by means of the above said belts 25 drives the wheel 23 and rotates drum 11 about its axis.

I shall now proceed to the matter of arrangement of the abrading elements within the drum and the mechanism for their adjustment. The mechanism includes a ring gear 50 disposed at the front end of the drum within a recess 50a on the wall thereof, the drum being adapted to rotate about the axis of said drum. The rotation of the gear ring is effected by means of a pinion 51 axially secured upon one end of shaft 52, the shaft being disposed parallel to the axis of the drum and being supported by bearings in plates 53 and 54, respectively. A gear wheel 55 keyed to shaft 52 is in mesh with a worm 56, the latter being disposed radially within the wall of the drum and terminating at the outer end with a dial 57. The face of the dial is provided with suitable calibrations 57a which may be read with respect to a stationary mark or marks 59 on the outer surface of the drum. A socket 58 centrally located in said dial, contains a stud 58a by means of which a rotary movement may be imparted to the above said worm 56.

Actuated by the ring gear 50, are four gear wheels 60 which are in mesh therewith, the wheels being equally spaced at 90 degree intervals from each other. As all the wheels are of the same size and structure, a description of one and the elements working therewith, will apply to the remaining three wheels and the respective elements working therewith.

Each of the respective wheels 60 is axially mounted on a shaft 61 having its bearings in plates 53 and 54 said shaft supporting also an oblong pinion 62. The latter is in mesh with a pair of racks 63 each of them being located in a circular well 64, in a radial relation to the wall of the drum 11. Passing through an axial bore in each rack is a bolt 65 which at the inner end is threaded into a hole 66 in a member 67. The latter serves as a backing and a holder for a honing stone 68 to which said stone is bonded in any suitable manner. Each of the stones has an arcuate face 68a, the stones being disposed with respect to each other in such a manner that their faces define a complete circle as best shown in Fig. 10.

Located between wells 64, and alined therewith is a well 69 containing therein a cylindrical casing 70. The casing is open at its outer end, and closed at its inner end but is provided within said inner end with a bore 71 for accommodation of a bolt 72 which being axially located within the casing, is threaded at its inner end into a hole 73 in said stone holder 67. A spring 74, coiled about the bolt 72, bears against a washer 75 the object of the construction being to eliminate any play or looseness in the position of the stones effected by means of said racks 63.

I shall now describe the complementary assembly designed to co-operate with said drum and including means for support of the piston rings to be exposed to the abrading action of the honing stones in said drum. The assembly includes a platform composed of a top 76 and two supporting side wells 77, arranged in a spaced relation to each other as shown in Fig. 3, each wall having an outwardly extending bottom flange 78. Located upon the top is a circular turntable 79 including an annular member 80 fitting into a circular aperture 81 within said top. Secured to the under surface of the annular member 80 by means of screws 82, is a disk shaped retaining plate 83, the marginal portion of the plate abutting the underside of said top 76. A central part of the disk including a portion 84 which is raised above the top surface of the marginal area of the plate, is provided with a circular opening 85. The opening is equipped with a bushing liner 86, and fitting into said bushing is a hollow vertical pin 87 which at a point adjoining its lower end contains an intake port 88 for admission of a fluid coolant into an axial duct 89 within said pin. The coolant to which I shall refer later on, is intended to travel upwardly through said duct 89 to an outlet port 90 in the upper portion of the pin. It will be noted that the pin is provided with an annular flange 91 and that the inlet port 88 is located under the above said retaining plate 83.

Forming a part of the turntable 79 is a super-structure generally indicated by numeral 92 and including an oblong, dome-shaped top 93 and vertical side walls 94. The central portion of the superstructure is provided with a vertical bore 95 for reception of a cylindrical member 96. At the top, said member 96 includes an external flange 97 fitting into an annular recess about said bore 95. A screw 99 passing through an aperture in said flange 97 secures said member 96 to the body of the dome. The wall of said member 96 contains two apertures 100, the apertures being disposed diametrically with respect to each other at the level of the outlet port 90 in the above said pin 87, while the pin itself is provided with two grooves 101, one above and one below said outlet port 90, the grooves containing a suitable packing against leakage.

Opening into the body of the dome-like superstructure 92 from each end thereof, is an axial bore 102 containing therein 103. Inwardly from the end of the bore, that is in the direction of said pin 87, the body of the dome is provided with a vertical slot 104. The inner side of the slot opens into another bore 105 which is axially alined with said bore 102 but is of a reduced diameter. A shell 106 lines the surface of said smaller bore 105. A short passageway 107 at the inner end of bore 105 leads into aperture 100 in said member 96.

It will be understood that the above description fits both ends of the superstructure 92.

Fitted into each slot 104 in an axial alinement with the two bores 102 and 105, is a ring 108 as best shown in Figs. 1 and 2, the outer diameter of the ring being such that at the top of the dome, the ring is flush with the surface thereof. Radially projecting from the outer surface of the ring is an arm 109 which at its outer end terminates with a collar 110 embracing a tube 111 which contains a spring actuated plunger 112.

Secured within the bores 102 and 105 respectively at each end of the dome, is one end of a shaft 113, the diameter of the shaft being stepped down to fit into ring 108, and again stepped down to fit into liner 106 in the bore 105. A groove 114 in the outer surface of the shaft close to its inner end contains a packing against leakage. The ring 108 is suitably keyed to that portion of the shaft which is embraced by it in order that a limited rotary movement about its axis may be imparted to the shaft by means of said ring. As shown in the drawings, the shaft is provided with an axial duct 115 and although the outer end portion of the shaft is tapered as shown at 116 in Fig. 4 the inner diameter of the bore is not affected thereby. It will be noted that the wall of the shaft at its outer end is perforated by two diametrically opposed holes 117. To these I shall refer presently. Embracing a portion of the shaft at its outer end, is a collar 118, the collar abutting at one end an integrally formed shoulder 119 on said shaft. At the opposite end, said collar is threaded internally as shown at 120, the threaded end of the collar being in a spaced relation to the tapered portion of the shaft. Two diametrically alined holes 121 in the collar are in register with the above named holes 117 in the wall for the shaft for the reception of a transverse pin 122. Numeral 123 indicates a bushing also provided with two holes for reception of the pin, the bushing being interposed between the collar 118 and the shaft.

Threaded into the outer end of the collar and over the tapered end 116 of the shaft is the shank 124 of a carrier adapted to support a plurality of piston rings to be honed within the above described drum 11 of my apparatus. The carrier includes a head and a shank. The head is composed of a solid drum-like rear member 125 and a plurality of disks 126 each including on one side thereof a spacer 127 extending diametrically over the face of the disk. At each end the spacer stops short of the rim of the disk by a distance somewhat smaller than the thickness of a piston ring. Laterally each spacer is of a width dimensionally smaller than the gap of a piston ring in its fully expanded position. A piston ring 144 with a gap 145 is shown in Fig. 5. At one end the spacer and the body of the disk of which the spacer is a part, is provided with a slot 128 for reception of a flat fin 129 which fits into similar slots in all the disks and extends to their respective rims. Each disk contains a plurality of transverse openings 130 for transmission of a cooling fluid and a plurality of holes 131 in the spacer 127 for employment of bolts by means of which the disks are held together. Two of said bolts 132, inserted through holes in an end plate forming the outer end of the carrier, are threaded into the solid rear portion 125 of the carrier as best shown in Fig. 4, while an axial bolt 134 extends from said rear portion 125 and passes through all the disks including the spacers thereon. Numeral 135 indicates a nut applied to the outer end of said bolt 134, over the outer surface of the end plate 133. A radial slot 136 in said plate and a similar slot 136a in the solid rear portion 125 of the carrier serve to retain therein the ends of the fin 29 which is secured in place by means of pins 137.

Returning now to the platform 76 best shown in Fig. 4, I wish to point out that the latter includes a plurality of ball bearings 138 each of which rests on a vertically slideable member 138a disposed upon a coil spring 139 in a well 140. It is upon these ball bearings that the turntable 79 equipped with an annular race 141 resting on said bearings, is adapted to be rotated about the hollow pin 87. And it is to the inlet port 88 of said pin, that a coolant is supplied through pipes 142 from a source of supply which is not shown.

Mounted on the turntable 79 on each side of the superstructure 92, and in axial alinement with the respective plunger 112, is a cylindrical keeper 143 provided with an inner bore into which the plunger is adapted to be thrust by a spring.

Finally to conclude the description of the apparatus I wish to refer to an oil pan 145. The pan is provided with downwardly extending sides 146 to protect the sides of the dovetail slide 10b. Attached to the front end of the carriage 37, the pan is adapted to travel back and forth with said carriage.

Prior to setting the apparatus in operation, the relative positions of the drum 11 and the carriers of the piston rings are to be such that one of said carriers is to be directly in front of, and axially alined with the outwardly flaring mouth 18 of cylinder 17 in said drum but in a spaced relation thereto as shown in Figs. 1 and 2. Furthermore the position of said carrier is to be such that the oblong fin 129 will be in a vertical plane below the axis of the carrier. Now a number of piston rings, each in its fully expanded condition with the gap 145 fully open, may be loaded upon the carrier. Specifically this is done by having each individual ring with its gap down, slipped from above manually over the spacer 127 of the respective disk 126 as shown in Fig. 5. As the carrier includes a number of disks, each having a spacer 127, a number of piston rings equal to the number of spacers between said disks, may be loaded at one time upon said carrier.

It will be noted that a ring so slipped over a spacer 127, hangs freely upon said spacer and that the end portions of the ring adjoining the gap therebetween extend beyond the rim 126a of the respective disk.

Assuming that a number of piston rings have been loaded upon the respective carrier, that the hydraulic mechanism to drive the carriage 37 is in readiness and that a coolant for supply to the apparatus through duct is available, the apparatus may be set in motion. This will be effected by means of the above described electric motor 42 which will cause the drum 11 to rotate about its axis while carriage 37 supporting said drum will be moved back and forth, first forwardly in the direction of the carrier facing the drum and over said carrier, then back away from it. The limits of movement of the drum and members axially connected thereto are shown in Fig. 8 in dotted lines 17a and 30, respectively. In the course of the forward movement of the drum, the mouth 18 of the cylinder 17 will come over the rings which as a result of the gradually decreasing diameter of the mouth, will be compressed till the free ends of the respective rings will come into abutment with the sides of the fin 129 as shown in Fig. 9. As the drum will move on, still in the same direction, it will bring the abrading elements 68 first into an operative contact with the outer surfaces of the respective rings, then past said rings, the forward movement of the drum being followed by a return movement thereof. The progressive positions of the carrier with respect to the drum are shown in Fig. 8 in solid lines 124 and in dotted lines 124a and 124b, respectively. It will be remembered that all during the movement of the carriage 37, the drum will continue rotating while the piston rings will be held in a stationary position by means of said fin 129. While so secured against rotation, the rings will be also radially compressed by the honing stones 168, which as already described are arranged about the axis of the drum. The inner surfaces of the stones define a circle of a diameter substantially identical with that of a cylinder in an internal combustion engine in which the pistons are to be used.

To repeat, the pistons are held on the carrier, each in a separate compartment between two adjoining disks where its sides are unrestrained and where each is free to expand under its own resiliency and tension against the abrading stones but is held against rotation by a stationary fin fitting into the gap between the ends thereof. It will be understood that all during the abrading operation as above described, the rings will be cooled by a suitable coolant according to the generally accepted practice.

While a single carrier of rings would render my apparatus complete, I employ two carriers for the sake of efficiency and an increased output. The arangement shown by me permits the loading of a batch of rings upon one carrier while another batch of rings is being honed upon the opposite carrier. After the first batch has been honed to a desired degree, and the drum has receded from the carrier, which shall be called the first carrier, the turntable 79 is swung 180 degrees about its axis bringing another batch of rings already loaded upon the second carrier to face the mouth 18 leading to the drum 11. Again the steps by means of which the rings will be exposed to the honing stones, will be repeated but while this goes on, plunger 112 in the first carrier will be withdrawn from its keeper 143, and ring 108a will be turned manually by means of arm 109 to the extent of 180 degrees causing said first carrier to revolve about its axis till the fin 129 forming a part of the carrier will be in a vertical position above the axis of the carrier as shown in Fig. 6. This diametrically reversed position of the carrier will permit rings 144 to slip down from the carrier by gravity the free ends of the rings straddling in their descent the sides of the respective spacers 127.

It will be understood that the invention described herein will permit some minor changes both in the method and the structure as disclosed herein, and that such changes may be without departing from inventive concept embodied in said invention. What I, therefore wish to claim is as follows:

1. The method of honing annular objects each comprising a single member in an annular form and having ends yieldably spaced from each other by a gap, the method comprising compressing the object radially, placing it axially within a plurality of abrading elements having faces defining a circle, allowing the object to expand freely for contact of its peripheral surface with the faces of the abrading elements, effecting a relative rotary movement between the abrading elements and the object but preventing simultaneous rotation of both, the abrading elements and the object, by wedging the ends of the object, at the gap, against means operatively unconnected with the abrading elements.

2. The method of honing a split piston ring of the type in which its ends are separated by a gap, the method comprising placing the ring upon axial supporting means, placing the ring with supporting means axially within a circle of abrading elements for a frictional contact of the outer periphery of the ring with the abrading elements, permitting the ring to expand freely against said abrading elements and rotating the abrading elements about the ring but preventing the rotation of the ring by wedging it endwise at the gap.

3. The method of honing radially expansible piston rings of the split type in which the ends of a ring are separated by a gap, the method comprising, placing the rings upon supporting means fitting into the rings axially, compressing the rings radially, placing them with their support within a plurality of abrading elements, the faces of which define a circle, keeping the respective rings in a plane at right angle to the axis of the circle, permitting the rings to expand freely into a frictional contact at their respective peripheries with the faces of the abrading elements, and rotating the abrading elements about the axis of the rings but preventing rotation of said rings by wedging them endwise at their respective gaps.

4. An apparatus for honing piston rings, the apparatus comprising a horizontal base, means mounted on the base and supporting a horizontal drum, a plurality of abrading elements at one end to afford axial access to the space encompassed by said abrading elements, a carrier mounted on the same base and adapted to support a plurality of piston rings, the carrier comprising a shaft in an axial alinement with the drum a plurality of disks at one end of the shaft, the disks being alined with the axis thereof and spaced from each other by spacers there between, an oblong fin radially fitted into said disks from the periphery thereof and extending into the spaces between the disks, the space between each two adjoining disks being wide enough for reception of an individual disk edgewise, the fin being adapted to fit into the gaps of the respective rings, power means to cause a reciprocal, straight line movement between the drum and the carrier to bring the rings on the carrier into the space within the abrading elements in the drum for abrasive action by said elements along the periphery of the respective rings, and power means to impart a relative rotary movement between the drum and the carrier.

5. An apparatus for honing piston rings of a split, expansible type, wherein each ring has two ends yieldably spaced from each other by a gap, the apparatus comprising a base, a horizontal slideway rising therefrom, a carriage mounted upon the slideway for a reciprocal straight line movement thereon, a drum mounted horizontally upon said carriage and adapted to be rotated about its axis, the drum being open at both ends a plurality of abrading elements within the drum the elements having operative faces in a circular arrangement about the axis of the drum, a cylindrical member axially fitting into one open end of the drum, and having a mouth tapering gradually from its outer end inwardly in the direction of the abrading elements to afford access into the space within the abrading elements, a carrier of piston rings to be honed by said abrading elements, the carrier being mounted on a platform rising from said base, and comprising a shaft in an axial alinement with the mouth of the cylindrical member a plurality of disks at one end of the shaft, the disks being alined axially therewith and being spaced from each other by spacers there between an oblong fin radially fitted into the disks from the periphery thereof and extending into the spaces between the disks, the space between the individual disks being wide enough for reception edgewise of a piston ring, the fin being adapted to fit into the gap of each ring, power means to move the carriage back and forth in a straight line first to bring, the abrading elements within the drum over the piston rings on the carrier, into operative contact with the peripheral rims of the piston rings, and back away from them, and power means to impart to the drum a rotary movement about its axis.

6. An apparatus for honing piston rings of a split, expansible type, wherein each ring has two ends yieldably spaced from each other by a gap, the apparatus comprising a base, a horizontal slideway rising therefrom, a carriage mounted upon the slideway for a reciprocal straight line movement thereon, a drum mounted horizontally upon said carriage and adapted to be rotated about its axis, the drum being open at both ends a plurality of abrading elements within the drum, the elements having operative faces in a circular arrangement about the axis of the drum, a cylindrical member axially fitting into one open end of the drum, and having a mouth tapering gradually from its outer end inwardly in the direction of the abrading elements to afford access into the space within the abrading elements, a carrier of piston rings to be honed by said abrading elements, the carrier being mounted by intermediate means upon said base and comprising a shaft in an axial alinement with the mouth of the cylindrical member in a normally spaced relation thereto, a plurality of disks at one end of the shaft, the disks being axially alined therewith and being spaced from each other by spacers there between, each of the spacers including a fin radially extending to the periphery of the adjoining disks, the space between the disks being wide enough for frictionless reception edgewise, of a piston ring, the fin being adapted to fit into the gap of the ring disposed between said adjoining disks, power means to move the carriage back and forth in a reciprocating movement, first to bring the tapered mouth of the cylinder over the piston rings on the carrier to compress them radially and to bring, in continuation of the movement, the abrading elements into abrasive contact with the outer peripheries of the piston rings, and back away from said rings and to impart to the drum, during the reciprocating movement thereof, a rotary movement about its axis.

7. An apparatus as described in claim 5 in which the carrier of piston rings including a shaft and a plurality of disks is provided with an axial duct in the shaft and a plurality of openings in the disks for supply from an outside source of a coolant to said rings.

8. As a part of an apparatus for honing piston rings an open end drum having a thick wall, a cylinder axially fitted into one end thereof and having a mouth tapering in diameter from its outer end towards the drum, a plurality of abrading elements within the drum in a circular arrangement about the axis thereof, the faces of the abrading elements defining a circle, a plurality of radial wells in the wall in a spaced relation to each other, a rack within each well, the rack being at its inner end secured by intermediate means to an abrading element and gear means including a pinion mounted within the wall for the operation of each rack, to adjacent the position of each abrading member radially.

9. As a part of the apparatus for honing piston rings a horizontally disposed open end drum comprising a thick wall, a cylinder axially fitted into one end of the drum and having a mouth tapering in diameter from the outer end of said member in the direction of the drum, a plurality of abrading elements disposed within the drum, the elements being in an annular arrangement about the axis of the drum, rack and pinion means back of each abrading element and operatively connected thereto, gear means including a ring gear seated in an annular recess in the wall of the drum in an axial relation to said drum for operation of all the rack and pinion means, and a worm, radially disposed within the wall for actuating by intermediate means, of the ring gear a dial axially carried by the outer end of the worm for rotation therewith the dial being disposed at the surface of the drum.

10. As a part of an apparatus for honing circular piston rings having their respective ends spaced by a gap, a carrier for piston rings to be honed, the carrier including a shaft disposed at one end in a supporting structure and connected at the other end to a head composed of a shank and a plurality of parallel disks disposed axially to the shaft, each disk being provided with an integrally formed spacer disposed diametrically over one of its faces, the spacer being of a width smaller than the width of the gap in a fully expanded ring, and being at one end removed from the periphery of the disk by a distance smaller than the radial thickness of the ring, said spacer including at its opposite end a thin radially disposed fin, extending up to the periphery thereof, the space between each two adjoining disks serving to contain a single piston ring in a laterally unrestrained, parallel position to the adjoining disks, while the fin is adapted to fit into the gap of the ring in its radially compressed condition, to prevent rotation of the disk, the shaft, the shank, and the disks, being provided with duct means for admission of a coolant to the spaces between said disks, and bolt means to hold the disks in place upon said shank.

11. In an apparatus, for honing piston rings in combination with a drum open axially at one end, and including a plurality of abrading elements in an annular arrangement about its axis, means for support of a plurality of piston rings to be honed within the drum, said means comprising a platform, a turntable mounted for rotation thereon, a superstructure rising from the platform and including an oblong dome shaped body, diametrically disposed upon said turntable, said body being provided with a horizontal bore at each end, a shaft secured at one end within said bore, and a similar shaft secured at one end within the other bore, the shafts being normally alined with the axis of the drum, each shaft being provided at its outer end with a plurality of parallel disks, axially alined with the shaft, and spaced from each other for reception of individual disks between each two adjoining disks, the turntable being adapted to be rotated about its axis to alternately bring the respective shafts into alinement with the axis of the drum, preliminary to the operative engagement of the abrading elements upon the piston rings, the above shafts and the disks, being provided with duct means to deliver from outside source a coolant to the spaces between said disks.

12. As a part of an apparatus for honing piston rings of a split type in which the ends of a ring are spaced by a gap, a platform, a turntable mounted thereon, the turntable having an axial aperture therein, a vertical pin fitting into said aperture and affixed in a stationary position with respect to the platform, the pin being provided with an axial duct, an inlet port at the bottom and a radial outlet port at a level adjoining its top, an oblong dome-shaped body mounted on the turntable, the body being provided, midway its length, with a vertical bore to fit about the outer surface of the pin, and with a horizontal bore at each end, each of the horizontal bores terminating at its inner end with a passageway in the direction of the pin, at the level of the outlet port therein, a shaft axially secured at one end in one bore, and a similar shaft at one end axially secured within the other bore, the shafts extending in the opposite directions from said body, each shaft being provided at its outer end with a plurality of parallel disks axially alined with the shaft, and provided with transverse opening therein, the disks being spaced from each other for frictionless reception of individual piston rings between each two adjoining disks, a fin between each two disks, the fin extending radially to the peripheries of said disks, and being adapted to fit into a gap of the piston ring disposed therebetween, each shaft being provided with an axial cut leading from the passageway at the inner end of the respective horizontal bore, to the openings in the disks, the turntable being adapted to be rotated about the pin to bring the duct of the respective shaft in register with the outlet port in the pin.

13. As a part of an apparatus for honing piston rings of a split type in which the ends of a ring are spaced by a gap, a platform, a turntable mounted thereon, the turntable having an axial aperture therein, a vertical pin fitting into said aperture and affixed in a stationary position with respect to the platform, the pin being provided with an axial duct, an inlet port at the bottom and a radial outlet port at a level adjoining its top, an oblong dome-shaped body mounted on the turntable, the body being provided, midway its length, with a vertical bore to fit about the outer surface of the pin, and with a horizontal bore at each end, each of the horizontal bores terminating at its inner end with a passageway in the direction of the pin, at the level of the outlet port therein, a shaft axially secured at one end in one bore, and a similar shaft at one end axially secured within the other bore, the shafts extending in the opposite directions from said body, a ring embracing each shaft, and keyed thereto, and a radial arm extending from said ring for manual operation to impart to the shaft a limited rotary movement about its axis, a cylindrical keeper on the turntable on each side of the dome-shaped body, and a slideable plunger within the outer end of each arm, the plunger being adapted to be alined with said keeper, and to enter said keeper to prevent rotation of the shaft about its axis, each shaft being provided at its outer end with a plurality of parallel disks axially alined with the shaft, and provided with transverse opening therein, the disks being spaced from each other for frictionless reception of individual piston rings between each two adjoining disks, a fin between each two disks, the fin extending radially to the peripheries of said disks and being adapted to fit into a gap of the piston ring disposed therebetween each shaft being provided with an axial duct leading from the passageway at the inner end of the respective horizontal bore, to the openings in the disks, the turntable being adapted to be rotated about the pin to bring the duct of the respective shaft in register with the outlet port in the pin.

14. An apparatus for honing radially expansible piston rings of a split type in which the ends of a piston ring are spaced by a gap, the apparatus comprising, a base, a horizontal slide thereon, a carriage mounted on the slide for a reciprocal movement thereon, a pair of vertical standards mounted upon the carriage, a horizontal open end drum supported by said standards for rotation about its axis, a plurality of abrading elements within the drum in an annular arrangement about the axis thereof, a cylindrical member connected axially to one end of the drum, said member being provided with a mouth tapering in diameter from the front end of said mouth inwardly towards the drum and affording access to the space within the abrading elements, a platform mounted on said base and disposed in a spaced relation to said cylinder, a horizontal turntable mounted on the platform, an oblong dome shaped body on said turntable, one end of said body containing one end of a horizontal shaft, the other end of the body containing another horizontal shaft, the shafts being aligned with each other and being normally alined with the axis of the drum but extending in opposite directions, radially with respect to the center of the turntable, each shaft being connected at its outer end with a carrier of piston rings, said carrier comprising a plurality of parallel disks provided with transverse opening therein, the disks being axially alined with the respective shaft and spaced from each other by diametrically disposed spacers, each spacer being of a width below that of the gap of an expanded piston ring, said spacer including at one end thereof a fin radially extending to the peripheries of the disks straddling said spacer, the fins of all the spacers being alined and in the normal position of the respective shaft being disposed vertically below the axis of the shaft for loading of piston rings upon said carrier, an arm connected to each shaft to impart thereto a rotary movement to bring the fins into a vertical position above the axis of the shaft for release of piston rings from the carrier, each shaft being provided with an axial duct, pipe means leading through intermediate means to said ducts and to the openings in the disks for a coolant to the spaces between the disks, power means to rotate the drum about its axis, and to reciprocate the carriage for axial engagement of the abrading elements within the drum, with the carrier loaded with piston rings to be honed.

References Cited in the file of this patent

UNITED STATES PATENTS

| | | |
|---|---|---|
| 1,056,212 | Pierstein | Mar. 18, 1913 |
| 1,311,937 | Williams | Aug. 5, 1919 |
| 1,654,736 | Kistner | Jan. 3, 1928 |
| 1,783,047 | Marshall | Nov. 25, 1930 |
| 2,387,138 | Fruth | Oct. 16, 1945 |
| 2,422,418 | Hutto | June 17, 1947 |